Figures 1, 2:
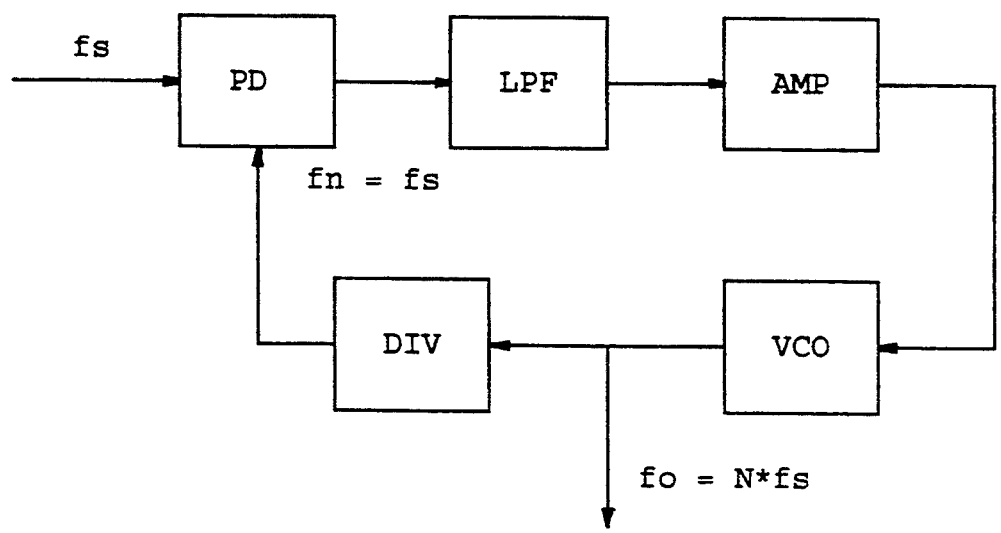

United States Patent [19]

Vigelius

[11] Patent Number: 5,352,959
[45] Date of Patent: Oct. 4, 1994

[54] METHOD AND CIRCUIT FOR GENERATING THE CONTROL VOLTAGES OF THE DYNAMIC CONVERGENCE IN A COLOR DISPLAY TUBE

[75] Inventor: Kari Vigelius, Salo, Finland
[73] Assignee: Salcomp Oy, Salo, Finland
[21] Appl. No.: 969,787
[22] Filed: Oct. 29, 1992
[30] Foreign Application Priority Data
Oct. 31, 1991 [FI] Finland ............................. 915157
[51] Int. Cl.$^5$ .................. H01J 29/51; G09G 1/28
[52] U.S. Cl. ............................. 315/368.11; 315/368.12
[58] Field of Search ............... 315/368.11, 368.12, 315/367, 368.28

[56] References Cited
U.S. PATENT DOCUMENTS 4,095,137  6/1978  Oswald .......................... 315/367
4,672,275  6/1987  Ando ......................... 315/368.11

Primary Examiner—Gregory C. Issing
Attorney, Agent, or Firm—Cooper & Dunham

[57] ABSTRACT

A method and a circuit for generating the control voltages of the dynamic convergence in a color display tube, in which the current of the convergence coils (HC, VC) is controlled. The control voltages for the convergence coils (HC, VC) are obtained from several controlling means (1-16). A voltage independent of the horizontal and vertical deflection frequencies is switched to the control means.(1-16). The voltage from each controlling means (1-16) is switched to the coils (HC, VC) by signals ($f_{ch}$, $f_{cv}$) synchronized to the horizontal and vertical deflection pulses ($f_h$, $f_v$), whereby the convergence of different parts (a1-a16) of the display is controlled by a voltage provided by a separate controlling means (1-16).

14 Claims, 3 Drawing Sheets

| a1 | a2 | a3 | a4 |
| --- | --- | --- | --- |
| a5 | a6 | a7 | a8 |
| a9 | a10 | a11 | a12 |
| a13 | a14 | a15 | a16 |

METHOD AND CIRCUIT FOR GENERATING THE CONTROL VOLTAGES OF THE DYNAMIC CONVERGENCE IN A COLOR DISPLAY TUBE

The present invention relates to a method and a circuit for generating the control voltages of the dynamic convergence in a color display tube in which the current of the convergence coils is controlled.

In TV display tubes the deflection of the electron beam is usually realized magnetically with the aid of coils by supplying an alternating current through them. Distortion might occur in the picture e.g. in the registration of colors due to non-homogeneity and non-linearity of the deflection fields and due to the effect of the earth's magnetic field. The picture quality can be improved by adding control coils and by controlling the current of these coils. The control of the dynamic convergence of In-line color display tubes is usually realized with four horizontal and vertical convergence coils located on the neck of the display tube. The current in these coils is changed according to the position of the electron beam, i.e. as a function of the horizontal and vertical deflection currents. It must be possible to freely control the current of the convergence coils, because the location of the convergence error varies from display tube to display tube.

Different methods have been developed in order to generate the control voltages of the convergence coils. The control was realized with an analog circuit, in which the horizontal and vertical deflection currents are formed into saw-tooth and parabola waves with the corresponding frequency. It was sought to generate the desired waveform for the coil control by summing and multiplying the above waves. This solution has a problem in that generally it works only on a narrow frequency band when realized in a simple way, and thus it is not suitable for displays operating on a broad frequency band. Even when more complicated versions were developed out of this circuit, they failed to produce all desired waveforms. It is also possible to realize the control of the coils with microprocessor controlled circuits, in which the desired waveform during the tuning phase is programmed into the processor memory, from which it is supplied to the convergence coils via a D/A-converter. All waveforms can be generated with the processor embodiment, but this embodiment is expensive, and further the memory programming requires special equipment, which usually is not available in service situations.

The objective of the present invention is to realize a method for generating the control voltages of the dynamic convergence in a color display tube, which obviates the above mentioned problems and with which the control can be realized with a circuit which is simple and which can be economically manufactured. The invention is characterized in that the control voltages for the convergence coils are obtained from from several controlling means, to which a voltage is switched from at least one voltage supply independent of the horizontal and vertical deflection voltages, and that the voltage from each controlling means is switched to the coils by signals synchronized to the horizontal and vertical deflection pulses, whereby the convergence of different parts of the display is controlled by a voltage provided by a separate controlling means.

The method according to the invention is based on the display being divided like a matrix into several squares, and on controlling components, preferably trimmers or D/A-converters providing the control voltage for each square of the display. Essentially the controlling components arranged in a matrix fashion are read by frequencies being multiples of the horizontal and vertical frequencies and being generated by phase locked loops. The display can be divided arbitrarily in the horizontal and vertical direction, e.g. into 4*4 squares. Then the simplest way to realize the control of the squares is by controlling components being correspondingly connected in a 4*4 matrix form, whereby the convergence of each square can be controlled by a controlling component at the corresponding position in the controlling component matrix. Thus it is profitable to locate the control means on a circuit board also in a matrix form, so that a person performing the tuning can easily find the correct controlling component. When a trimmer is used as a controlling component, the voltage to the trimmer is obtained by connecting each trimmer between the supply voltage and the ground, after which the correct control voltage is obtained by adjusting the trimmers. Instead of trimmers, D/A-converters can be used as controlling components. In this case the display tube comprises a processor which gives the D/A-converters initial values when the display tube is switched on. The processor may after this perform functions as measuring the frequency being fed to the display tube, controlling geometry, position and size of the picture and monitoring the incoming synchronic pulses. The voltage provided by the controlling components is connected to the coils by controlling the controlling components with switches whose state is changed with frequencies generated from the horizontal and vertical deflection frequencies. Controlling components corresponding to horizontal squares are switched with the frequency $f_{ch}$, which is n times the horizontal deflection frequency $f_h$, where n is the number of horizontal squares. The controlling components corresponding to the vertical squares are switched with a frequency $f_{cv}$, which is m times the vertical deflection frequency $f_v$, where m is the number of vertical squares. Thus the frequency $f_{ch}$ of a display divided into 4*4 squares is four times the horizontal deflection frequency $f_h$, and the frequency $f_{cv}$ is four times the vertical deflection frequency $f_v$.

Figure 3:
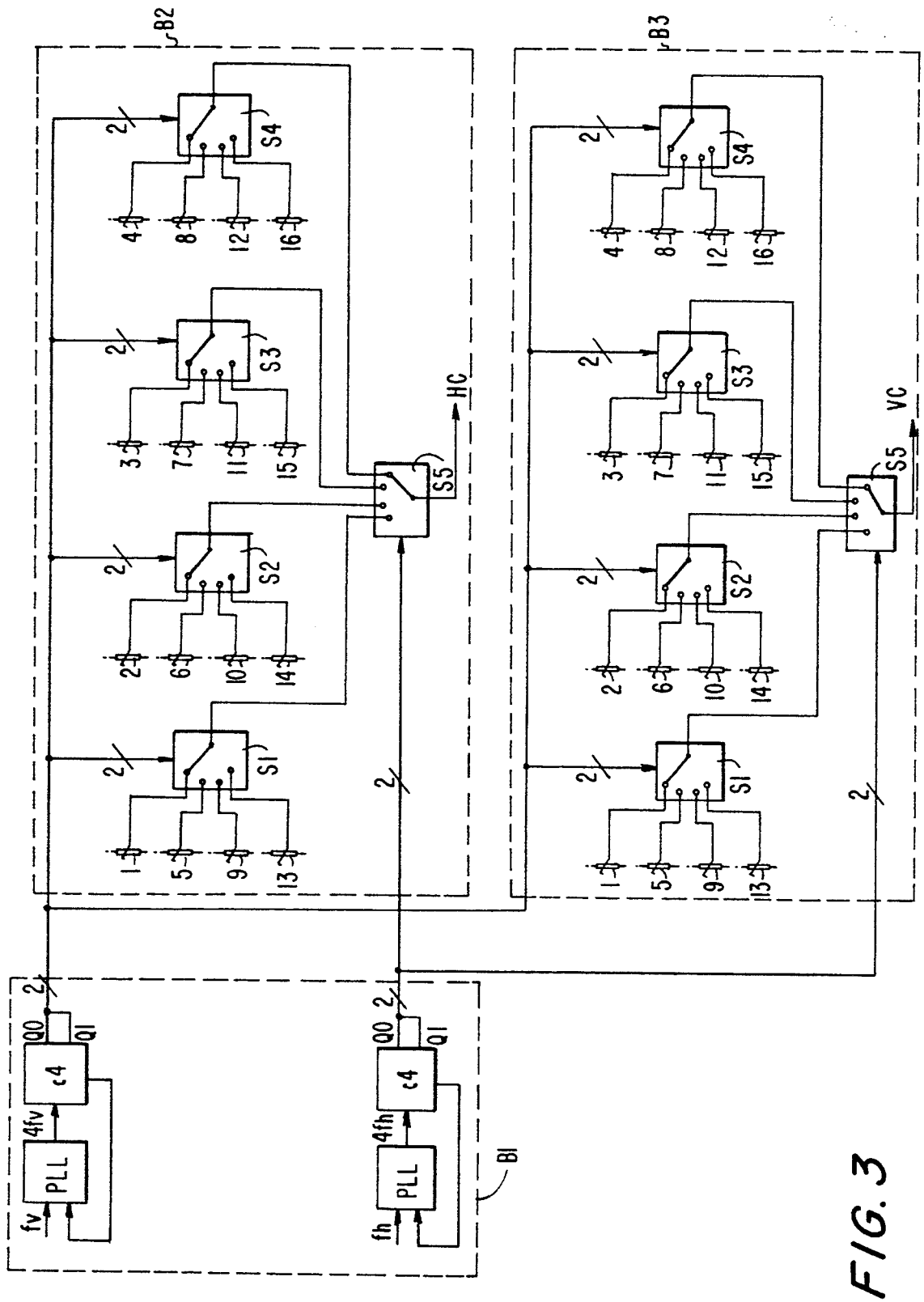
Figure 4:
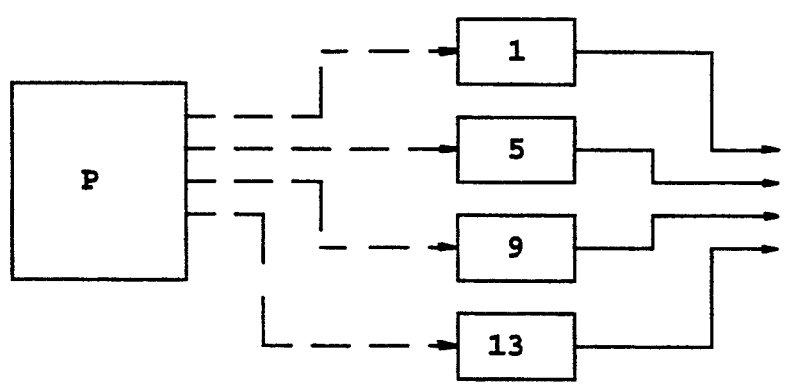

The invention is described in further detail below with reference to the enclosed figures, in which FIG. 1 shows a display divided into sixteen squares in a form of a 4*4 matrix, FIG. 2 shows the operating principle of a phase locked loop, FIG. 3 shows a diagram of a circuit embodying the operating principle of the method, and FIG. 4 shows another embodiment of implementing the control means.

As an example the display is in FIG. 1 divided into sixteen smaller squares a1-a16, which in the figure are numbered from one to sixteen, and corresponding to these squares the controlling means 1-16 are given corresponding numerals in FIG. 3, where the switches S5 are switched with a frequency $f_{ch}$ four times the horizontal deflection frequency, and the switches S1 -S4 with a frequency $f_{cv}$ four times the vertical deflection frequency. The frequencies $f_{cv}$ and $f_{ch}$ are generated by a phase locked loop PLL receiving as reference frequency the horizontal deflection frequency $f_h$ and the vertical deflection frequency $f_v$, respectively, and having in the loop a divider dividing by four, whereby an output frequency having a frequency four times the reference frequency is obtained.

The operating principle of the phase locked loop PLL is shown in FIG. 2, presenting a phase detector PD, a low-pass filter LPF, an amplifier AMP and a voltage controlled oscillator VCO. Further the loop contains, between the voltage controlled oscillator VCO and the phase detector PD, a divider DIV. With the phase locked loop the voltage controlled oscillator can be locked onto the reference frequency $f_s$ input to the phase detector. The phase detector PD generates several frequencies, from which the desired frequency is filtered with the low-pass filter LPF, the frequency signal being amplified in the amplifier AMP, which produces a signal controlling the voltage controlled oscillator VCO trying to lock on to the frequency $f_s$ and the phase of the reference signal. The frequency $f_o$ obtained from the voltage controlled oscillator VCO, and thus from the phase locked loop PLL, can be made a multiple of the reference frequency $f_s$ by placing a divider DIV between the output of the voltage controlled oscillator VCO and the second input of the phase detector PD. If the divisor of the divider is N, then the output frequency of the voltage controlled oscillator VCO is $f_o = N * f_s$, because the phase locked loop tends to lock the frequency $f_o$ provided by the voltage controlled oscillator VCO so that the frequency $f_n$ supplied to the second input of the phase detector PD equals the reference frequency $f_s$. The divisor DIV is used in the above mentioned way in the phase locked loop PLL to generate the switch frequencies $f_{ch}$, $f_{cv}$ from the vertical and horizontal deflection frequencies.

FIG. 3 shows how the switch frequencies $f_{ch}$, $f_{cv}$ are generated with the aid of the divisor :4 placed in the loop of the phase locked loop PLL, whereby the output frequencies $f_{ch}$ and $f_{cv}$ are obtained as quadruple frequencies of the reference or the vertical and horizontal frequencies. The control means 1-16 controlling the horizontal and vertical deflection coils HC, VC are connected and located in a corresponding manner in a matrix, such as the squares a1-a16 in FIG. 1, the convergence of which the control means control, the control means being shown here as trimmers. Each trimmer 1-16 in connected between a supply voltage, marked with a +, and the ground potential, whereby at a desired moment we obtain by adjusting the trimmers 1-16 a desired control voltage for the coils HC, VC and thus the desired convergence adjustment in an area a1-a16 of the display corresponding to the trimmer 1-16. The switches S1-S4 change their state with a vertical deflection frequency multiplied by m, m*$f_v$, where m is the number of the vertical squares/trimmers, in this example four, and the switches S5 change their state with a horizontal deflection frequency multiplied by n, n*$f_h$, where n is the number of the horizontal squares/trimmers, in this example four. During the first quarter of the vertical scan the switches S1-S4 are in the upper position, whereby only the topmost trimmer row is used, i.e. the trimmers 1-4. The switch S5 thus changes its state with a frequency four times the horizontal deflection frequency or the line frequency, so that during the first quarter of the horizontal scan it is connected to the switch S1 and thus to the trimmer 1. During the second quarter the switch S5 is connected to the switch S2 and thus to the trimmer 2, during the third quarter to the switch S3 and thus to the trimmer 3, and during the fourth quarter to the switch S4 and thus to the trimmer S4. Correspondingly, during the second quarter of the vertical scan the switches S1-S4 are in second position from the top or connected to the trimmers 5-8, whereby again the horizontal deflection switches the switch S5 to the switches S1 -S4 and thus to the trimmers 5-8. During the third quarter of the vertical deflection the control voltages of the trimmers 9-12 for the squares 9-12 are read in a corresponding way, and during the fourth quarter the control voltages of the trimmers 13-16 are read. In this way the voltage from the switches S5 changes synchronously with the deflection signal, and this voltage can be adjusted with the trimmers 1-16. A similar circuit arrangement is used for the control of both the horizontal and the vertical coils, i.e. there are two identical blocks B2 and B3 of trimmer matrices, one block B2 for the control of the horizontal convergence coils HC and one block B3 for the control of the vertical deflection coils. The deflection frequencies do not affect the control voltage waveform nor the amplitude.

The trimmers 1-16 shown in FIG. 3 show an example of realising the control means 1-16. The control means can be realised in different ways in order to provide the control voltages. In FIG. 4 has been shown the use of D/A-converters 1-16 as control means 1-16. In the figure only the four control means, i.e. D/A-converters 1, 5, 9, 13, giving the control voltages to switch S1 have been shown. Also a processor P has been provided, which gives all D/A-converters 1-16 initial values when the display tube is switched on. The D/A-converters are each naturally connected to the supply voltage, which is independent of the horizontal and vertical deflection voltages, the D/A-converters thereby providing control voltages, which are independent of the horizontal and vertical deflection voltages. The processor may after this perform functions as measuring the frequency being fed to the display tube, controlling geometry, position and size of the picture and monitoring the incoming synchronic pulses.

It is naturally possible to select a desired size for the matrix so that there are n horizontal squares and m vertical squares. Then the division ratio N of the divider DIV in the phase locked loop PLL has to be changed so that the division ratio N is n in the divider of the loop which provides the horizontal deflection frequency $f_v$, and m in the divider of the loop which provides the vertical deflection frequency $f_h$. The line oscillator and the phase detector already present in the television can be used as the phase locked loop PLL at the line frequency or the vertical deflection frequency. A divider DIV with the desired division ratio N has to be added into the loop. Thus parts already present can be used to realize the invention, and the trimmer matrix is a cheap component, so that the method according to the invention can be realized with a simple and economical circuit, with which the voltages of the convergence coils are easily controlled. Also D/A-converters can be used to give the control voltages, as explained. Further the method is independent of the frequency, so that it can be used at different frequency ranges and both at broad and narrow frequency bands.

I claim:

1. A method for generating the control voltages of the dynamic convergence in a color display tube, in which a current in a plurality of convergence coils is controlled and in which an electron beam is controlled by a plurality of horizontal and vertical deflection voltages, characterized in that the control voltages for the plurality of convergence coils are obtained from a plurality of respective controlling means, to which a voltage is coupled from at least one voltage supply, the magnitude of the voltage of the at least one voltage supply being independent of the horizontal and vertical deflection voltages, and that the voltage from each controlling means is switched to said plurality of convergence coils by a plurality of signals synchronized to the horizontal and vertical deflection voltages, and the convergence of a plurality of different non-overlapping parts of the display is controlled by a voltage provided by a separate controlling means for each part of the display.

2. The method according to claim 1, characterized in that the voltage provided by the controlling means is supplied to at least one horizontal convergence coil.

3. The method according to claim 1, characterized in that the voltage provided by the controlling means is supplied to at least one vertical convergence coil.

4. The method according to claim 1, characterized in that the control means are switched by a plurality of switches so that the display has a plurality of vertical and horizontal areas, the convergence of each being controlled by a different controlling means.

5. The method according to claim 1, characterized in that there are n*m control means being switched so that the display has n*m areas, the convergence of each area being controlled by a different controlling means, and that the areas are located on the display in a n*m matrix form so that there are n horizontal rows and m vertical columns.

6. The method according to claim 5, characterized in that there are 4*4 controlling means.

7. The method according to claim 5, characterized in that the controlling means are connected in a matrix form, and that the voltage provided by the controlling means on horizontal rows of the matrix are switched to the coils by first switches by signals synchronized to the horizontal deflection voltages, and that the voltages provided by the controlling means on the vertical columns of the matrix are switched to the coils by second switches by signals synchronized to the vertical deflection voltages.

8. The method according to claim 7, characterized in that the first switches switching the controlling means on the horizontal rows of the matrix are switched at a frequency, which is n times the horizontal deflection frequency, and that the second switches switching the controlling means on the vertical columns are switched at a frequency, which is m times the vertical deflection frequency.

9. A circuit for generating the control voltages of the dynamic convergence in a color display tube comprising a plurality of convergence coils with a current being controlled and an electron beam controlled by horizontal and vertical deflection voltages having respective horizontal and vertical deflection frequencies $f_h$, $f_v$, characterized in that the circuit contains means to generate a signal $f_{ch}$, and a signal $f_{cv}$, synchronized to the horizontal and vertical deflection frequencies $f_h$, $f_v$ respectively, and a circuit controlling the coils and comprising:

a plurality of control means providing control voltages for the convergence coils, each control means providing a voltage for a different non-overlapping part of the display than the other control means;

at least one power supply supplying the plurality of control means with a voltage, the magnitude of said voltage being independent of the horizontal and vertical deflection voltages; and switches, which are switched by a signal $f_{ch}$, and a signal $f_{cv}$ synchronized to the horizontal and vertical deflection voltages $f_h$, $f_v$ respectively, and which switch the voltages obtained from the plurality of control means to the convergence coils.

10. The circuit according to claim 9, characterized in that there are n*m control means being interconnected via switches into a matrix form so that there are n horizontal switch rows and m vertical switch columns.

11. The circuit according to claim 9, characterized in that the means for generating the signals synchronized to the horizontal and vertical deflection frequencies is a phase locked loop.

12. The circuit according to claim 9 or 10, characterized in that the control means are trimmers.

13. The circuit according to claim 9 or 10, characterized in that the control means are D/A-converters.

14. The circuit according to claim 9, characterized in that it further comprises:

means to generate the switch frequencies of the signals;

a circuit controlling at least one horizontal deflection coil; and a circuit controlling at least one vertical deflection coil.

* * * * *